(12) United States Patent
Miller

(10) Patent No.: US 7,159,810 B1
(45) Date of Patent: Jan. 9, 2007

(54) FOOD CONTACT DEVICE

(76) Inventor: Linda M. Miller, 16470 Farmington Rd., West Farmington, OH (US) 44491

( * ) Notice: Subject to any disclaimer, the term of this patent is extended or adjusted under 35 U.S.C. 154(b) by 0 days.

(21) Appl. No.: 11/167,814

(22) Filed: Jun. 27, 2005

(51) Int. Cl.
*A47J 17/00* (2006.01)

(52) U.S. Cl. .................................. 241/168; 241/169.2
(58) Field of Classification Search ............... 241/168, 241/169.2, 95, 273.1; D7/682; 30/303
See application file for complete search history.

(56) References Cited

U.S. PATENT DOCUMENTS

| | | | |
|---|---|---|---|
| 726,707 A | 4/1903 | Lavender | |
| 749,873 A | 1/1904 | Meher | |
| 935,576 A | 9/1909 | Bates | |
| 1,104,718 A | 7/1914 | Trevisan | |
| 1,520,436 A | 12/1924 | Peyton | |
| 1,581,310 A * | 4/1926 | Fetschan ..................... | 30/303 |
| 2,397,007 A | 3/1946 | Hosmer | |
| 2,505,096 A | 4/1950 | Christopher | |
| 2,680,907 A | 6/1954 | Palosaari | |
| 3,933,315 A * | 1/1976 | Popeil ......................... | 241/166 |
| 4,250,618 A * | 2/1981 | Custer et al. ................. | 30/114 |
| D260,841 S * | 9/1981 | Gilmore ...................... | D7/673 |
| 5,433,278 A * | 7/1995 | Shipley ...................... | 172/370 |
| 5,446,965 A | 9/1995 | Madridis | |
| 5,533,683 A * | 7/1996 | Fay et al. .................... | 241/169 |
| 5,732,616 A | 3/1998 | Bryan | |
| 5,983,503 A | 11/1999 | DiMaulo | |
| 6,986,478 B1 * | 1/2006 | Di Bitonto et al. ...... | 241/169.2 |
| 2003/0200875 A1 | 10/2003 | Chatfield | |
| 2004/0188555 A1 * | 9/2004 | Galante et al. .......... | 241/169.2 |
| 2004/0211069 A1 * | 10/2004 | Tuttle .......................... | 30/302 |
| 2004/0250667 A1 | 12/2004 | Atwater | |

* cited by examiner

*Primary Examiner*—Faye Francis
(74) *Attorney, Agent, or Firm*—The Webb Law Firm

(57) ABSTRACT

A food contact device including a handle member with a first end and a second end. The first end of the handle member includes a pressure enhancing structure. One or more blade elements are in direct or indirect contact with the second end of the handle member. In operation, a user grasps the handle member, effects force in a contact direction via the handle member and the pressure enhancing structure. In this manner, the blade element contacts a food item.

5 Claims, 2 Drawing Sheets

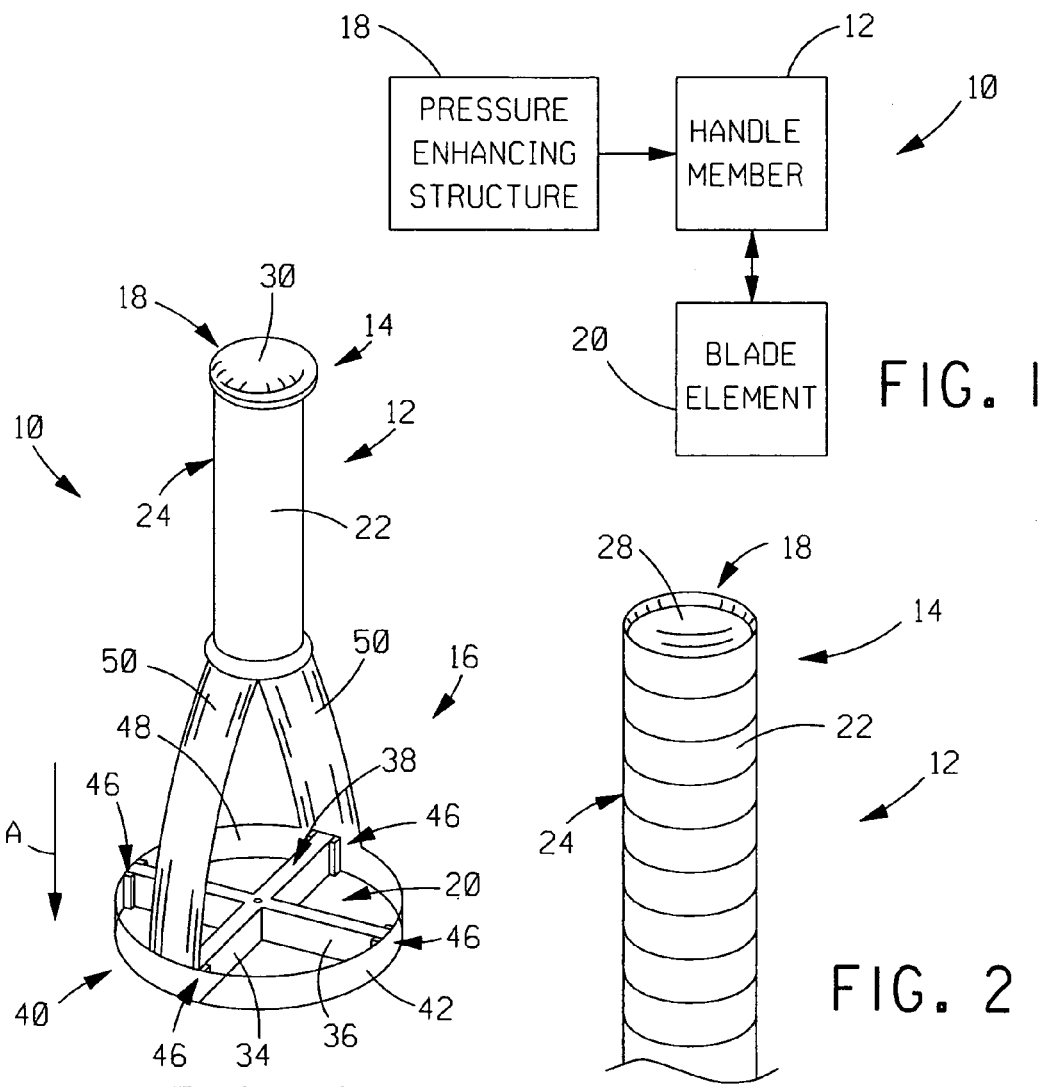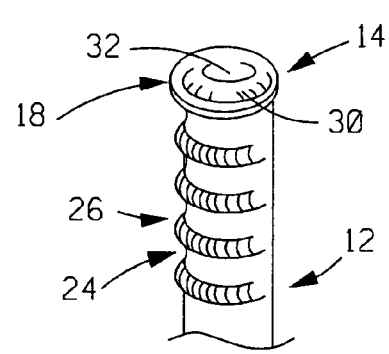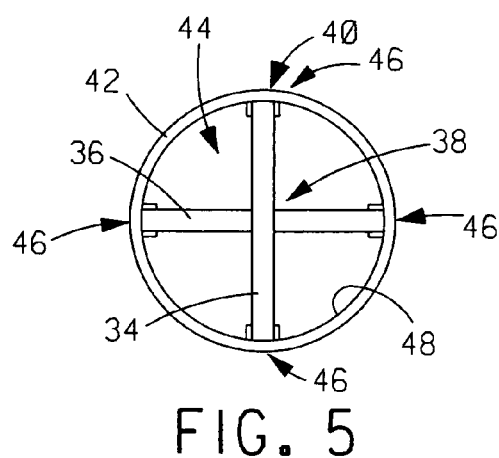

FOOD CONTACT DEVICE

BACKGROUND OF THE INVENTION

1. Field of the Invention

The present invention relates generally to devices, tools and implements, typically used in a kitchen in connection with cooking activities and, in particular, to devices, tools and other implements that are used to contact, cut, slice, separate or otherwise manipulate a food item, such as a food item placed in a skillet or pan.

2. Description of Related Art

As cooking, such as gourmet cooking, increases in popularity and people of all ages are in the kitchen engaging in cooking activities, additional cooking utensils, tools, implements and devices have been provided to provide the cook with a more efficient and satisfying cooking experience. Although a cooking activity has many and various actions associated with it, one common activity in food preparation is the requirement to cut, separate, slice or otherwise manipulate a food item, typically prior to or during heating thereof. For example, if a person wishes to separate ground meat in a frying pan, many cooks will use a spatula to separate the ground meat, which takes excessive time and energy to achieve any satisfactory results. Others may use a metallic chopping device, which can damage the frying pan or skillet, particularly a skillet coated with a material, such as a non-stick skillet and the like.

In order to prevent damage to a non-stick skillet surface, various chopping and separation devices have been provided in the prior art. For example, U.S. Pat. No. 5,732,616 to Bryan describes a device for separating moist, fatty ground meat. The device of the Bryan patent includes multiple separating blades 12, 14, 16 and 18, which are non-metallic and integral with one another. Each blade includes a front surface 20 and a rear surface 22. In addition, the blades of the device of the Bryan patent may be constructed from any desired material, such as thermoset plastic.

Similarly, U.S. Publication No. US 2003/0200875 to Chatfield is directed to a ground meat separator. The separator of the Chatfield publication includes a top portion with a handle 13, and blades 18, 19 run parallel to each other and attach at outer ends of the upper and lower corners. Blade 21 is specifically used to break up the meat. In addition, this blade may be formed from a heat-resistant plastic. Various other cutters, separators, knives and choppers according to the prior art are shown and described in U.S. Pat. No. 1,581,310 to Fetschan; U.S. Pat. No. 1,104,718 to Trevisan; U.S. Pat. No. 5,983,503 to DiMaulo; U.S. Pat. No. 5,446,965 to Makridis; U.S. Pat. No. 2,680,907 to Palosaari; U.S. Pat. No. 2,505,096 to Christopher; U.S. Pat. No. 2,397,007 to Hosmer; U.S. Pat. No. 1,520,436 to Peyton; U.S. Pat. No. 935,576 to Bates; U.S. Pat. No. 749,873 to Meher; U.S. Pat. No. 726,707 to Lavender; and U.S. Publication Nos. 2004/0250667 to Atwater; and 2004/0211069 to Tuttle.

However, the cutters and choppers of the prior art exhibit many deficiencies and shortcomings. First, the handles of prior art choppers do not include optimal structure to maximize the cutting or chopping force, and thereby result in insufficiently separated or cut material, and elongated cutting or chopping time. In addition, the prior art handles of these choppers or separators are ergonomically incorrect, and often display various safety drawbacks when extra force is applied to cut or separate a food item. Still further, these prior art choppers and cutters are difficult to use by people that have arthritis or other limitations. Also, when using the prior art choppers and cutters, the user experiences significant slippage on the handle portions, which also leads to various safety concerns, such as burning, scalding or other injury to the user.

SUMMARY OF THE INVENTION

Accordingly, it is an object of the present invention to provide a food contact device that addresses one or more of the above-identified concerns and overcomes the shortcomings of conventional food choppers, separators and cutters in the cooking and food preparation art. It is another object of the present invention to provide a food contact device that includes beneficial structure to enhance and optimize the pressure required to effect appropriate food contact for separation, and reduce the amount of time required for food preparation. It is a further object of the present invention to provide a food contact device that is more comfortable to a user when engaged in food preparation with the device. In accordance with the broad teachings of the present invention, a food contact device is provided.

In particular, a food contact device is provided for engaging, contacting, cutting, separating, chopping, slicing or otherwise manipulating a food item. The food contact device includes a handle member with a first end and a second end. The first end of the handle member includes a pressure enhancing structure. Further, one or more blade elements are in direct or indirect contact with the second end of the handle member. In use, a use grasps the handle member, effects force in a contact direction via the handle member and the pressure enhancing structure, such that the blade element contacts the food item, and thereby achieves the desired effect.

In one embodiment, the pressure enhancing structure is a pad element that is in direct or indirect contact with the first end of the handle member, while in another embodiment, the pressure enhancing structure is an indent extending at least partially within the first end of the handle member. In yet another embodiment, the blade or blades may be engageable with and releasable from a blade holding member, such that the blades can be removed therefrom. In yet another embodiment, the food contact device includes a splash guard in direct or indirect contact with a portion of the handle member. In particular, the splash guard is positioned above at least one of the blade elements, and this splash guard serves to protect the user from material moving upward toward the first end of the handle member. Still further, the handle member, the blade element or any combination thereof may be formed or coated with a material that will not scratch a surface of a cooking implement, or a material that is heat resistant.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 1 is a schematic view of a food contact device according to the principles of the present invention;

FIG. 2 is a close-up perspective view of one embodiment of a handle member and pressure enhancing structure of a food contact device according to the principles of the present invention;

FIG. 3 is a close-up perspective view of a further embodiment of a handle member and pressure enhancing structure of a food contact device according to the principles of the present invention;

FIG. 4 is a perspective view of one embodiment of a food contact device according to the principles of the present invention;

FIG. 5 is a top, sectional view of a ring member and blade elements of the food contact device of FIG. 4;

DESCRIPTION OF THE PREFERRED EMBODIMENTS

Figure 6:
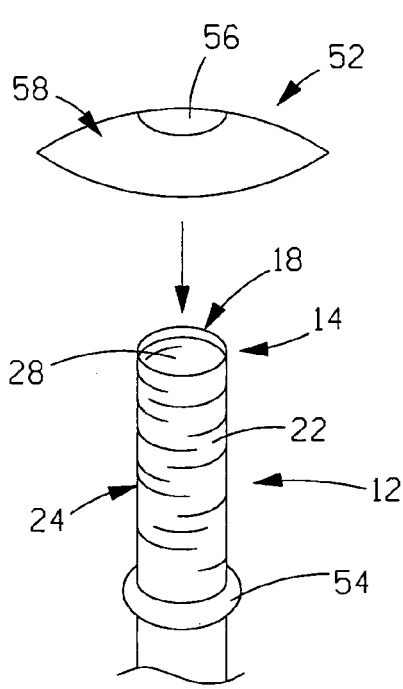
FIG. 6 is an exploded perspective view of one embodiment of a handle member and a splash guard according to the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to a food contact device 10, as shown in various embodiments in various views, as well as in use, in FIGS. 1–9. In particular, referring to FIG. 1, the food contact device 10 includes a handle member 12, with a first end 14 and a second end 16. The first end 14 of the handle member 12 includes or forms a pressure enhancing structure 18. At least one blade element 20 is in direct or indirect contact with the second end 16 of the handle member 12. In use, a user grasps the handle member 12, effects force in a contact direction A via the handle member 12 and the pressure enhancing structure 18. In this manner, the blade element 20 contacts a food item 100. This contact may move, cut, slice, separate, chop or otherwise manipulate the food item 100. The use of this pressure enhancing structure 18 allows for a better food manipulation process, and thereby reduces food preparation time.

As seen in FIGS. 2 and 3, and in one embodiment, the food contact device 10 also includes a gripping surface 22. The gripping surface 22 may be attached to, formed on or integral with a gripping portion 24 of the handle member 12. The gripping surface, such as a non-slip tape, ridged surface, rubber surface or other non-slip surface may allow the user to ensure effective chopping force in the contact direction A, without requiring an excessive amount of hand strength.

In one embodiment, and as best seen in FIG. 3, the gripping surface may include finger indentation portions 26 that are sized and shaped so as to accept a user's fingers therein. Therefore, in use, the user simply grasps the handle member 12, allowing his or her fingers to enter the finger indentation portions 26, and places their thumb at the second end 16 of the handle member 12, specifically at the pressure enhancing structure 18, and affects the chopping motion in the contact direction A.

As seen in FIGS. 2 and 6, the pressure enhancing structure 18 may be an indent 28, which extends at least partially within the first end 14 of the handle member 12. This indent 28, similar to the finger indentation portions 26, is specifically sized and shaped so as to receive a user's thumb at least partially therein. This also allows the user to effect a better grip around the handle member 12 when using the food contact device 10, such as when using the food contact device 10 in connection with a harder food item 100 that needs to be separated or chopped.

Figure 7:
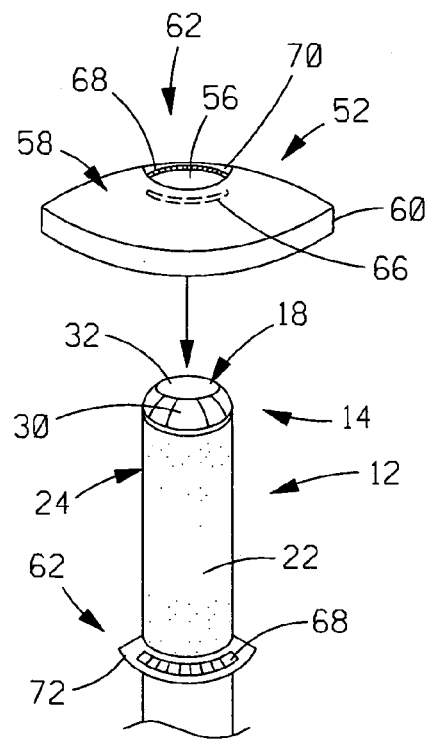
FIG. 7 is an exploded perspective view of a further embodiment of a handle member and a splash guard of a food contact device according to the principles of the present invention.

In another embodiment, and as seen in various views and structures in FIGS. 3, 4 and 7, the pressure enhancing structure 18 may also be a pad element 30. The pad element 30 is in direct or indirect contact with the first end 14 of the handle member 12. Like the indent 28, the pad element 30 allows the user to place his or her thumb against the pad element 30 to effect a better pressure or force in the contact direction A, without any discomfort to the user. As seen in FIG. 4, this pad element 30 may be positioned from and extend from the first end 14 of the handle member 12. As seen in the embodiments of FIGS. 3 and 7, the pad element 30 may include a pad element indent 32 that, like the indent 28 of the previous embodiment, allows the thumb to be at least partially enveloped within the pad element indent 32 to increase the gripping characteristics.

It is also envisioned that the pad element 30 is attached to, formed on or integral with the handle member 12. For example, it is further envisioned that the pad element 30 can be detached from the handle member 12, and another pad element 30 or other selectable pressure enhancing structure 18 be attached to the first end 14 of the handle member 12. Accordingly, the user may be provided with a variety of pressure enhancing structures 18, such that the user can pick his or her favorite and most comfortable pressure enhancing structure 18. For example, it is envisioned that a C-shaped structure or other thumb-receiving element, or even a padded ring (see FIG. 9) be used as the pressure enhancing structure 18. In general, this pressure enhancing structure 18 allows the user to comfortably effect a better motion and pressure in the contact direction A.

In another embodiment, multiple blade elements 20 are in direct or indirect contact with the second end 16 of the handle member 12. For example, as seen in FIGS. 4 and 5, a first blade element 34 and a second blade element 36 may be provided. In one embodiment, the first blade element 34 and the second blade element 36 intersect at a respective central portion 38 of each blade element 34, 36. In this manner, the blade elements 34, 36 create a cross pattern, which, in one embodiment, provides improved chopping or separating characteristics. Of course, any number and configuration of blade elements 20 are envisioned.

In one embodiment, the food contact device 10 includes a blade holding member 40 attached to the second end 16 of the handle member 12. The blade holding member 40 is attached to, formed with, integral with or engaged with the blade element 20. In another embodiment, the blade holding member 40 is a ring member 42 with an inner area 44. The ring member 42 is attached to the second end 16 of the handle member 12. In addition, the blade element 20 extends at least partially across the inner area 44 of the ring member 42. Particularly when used with multiple blades 20, such as in the embodiment of FIGS. 4 and 5, the ring member 42 is useful in appropriately engaging and maximizing the cutting area of the food contact device 10. In addition, the ring member 42 lends stability to the overall structure of the food contact device 10.

Also as seen in the embodiments of FIGS. 4 and 5, the blade element 20 may be engageable with and releasable from the blade holding member 40. In this manner, the blade element 20, such as the first blade element 34 and the second blade element 36, may be removed from the blade holding member 40 for a variety of reasons. As with the pressure enhancing structure 18, it is envisioned that multiple configurations of the blade element 20 may be provided. Therefore, the user may select a different configuration or blade type of the blade element 20, remove the current blade element 20 from the ring member 42, and insert the desired blade element 20. In addition, a removable blade element 20 allows the blade elements 20, 34, 36 to be cleaned, washed, sharpened or otherwise maintained.

In one embodiment, the blade holding member 40 includes at least one pair of aligned slots 46 positioned on an inner surface 48 of the ring member 42. As best seen in FIG. 5, the first blade element 34 and second blade element 36 are sized and shaped so as to mate with a respective pair of aligned slots 46.

Any type of releasable engagement structure is envisioned for use in engaging and releasing the blade elements 20 from the blade holding member 40. For example, while in one embodiment, the aligned slots 46 (as discussed above) may be used. It is also envisioned that releasable tabs, friction fitting or other similar arrangements or features can be used to releasably engage the blade elements 20 with the blade holding member 40. Such releasable engagement arrangements would be apparent to one skilled in the art.

In another embodiment, the food contact device 10 includes multiple arms 50. These arms 50 comprise the second end 16 of the handle member 12, and each arm 50 is attached to a respective portion of the blade holding member 40. In a preferred embodiment, the arms 50 are opposite each other on either side of the ring member 42, as seen in FIG. 4. As with the ring member 42, the spaced and attached arms 50 lend additional structural stability to the food contact device 10. In addition, the arms 50 may be attached to, formed with or integral with the handle member 12 and/or the blade holding member 40, such as the ring member 42.

As illustrated in FIGS. 6 and 7, the food contact device 10 may also include a splash guard 52. This splash guard 52 is in direct or indirect contact with a portion of the handle member 12, and positioned above the blade element 20, such as the first blade element 34 and the second blade element 36. Further, this splash guard 52 is used to protect the user from material moving up toward the first end 14 of the handle member 12. In particular, when the user is chopping or separating material in a heated cooking implement, such as a frying pan, the splash guard 52 prevents hot grease, food items, etc. from splashing up from the pan and onto the user's hand. As another example, if the user is using the food contact device 10 to chop an exceedingly hot or spicy food item 100, the splash guard 52 will prevent the liquid and other bits and pieces of the food item 100 from contacting the user's skin.

As with the pressure enhancing structure 18 and the blade element 20, it is envisioned that the splash guard 52 can be engageable with and releasable from direct or indirect contact with the handle member 12. In this manner, the splash guard 52 can be removed from the handle member 12 for a variety of reasons. For example, the splash guard 52 may be removed for washing or other maintenance purposes. It is also envisioned that multiple different and selectable splash guards 52 can be provided, such that the user may pick and choose which splash guard 52 is best for the present food preparation technique.

As seen in FIGS. 6 and 7, and in one embodiment, a rim 54 may be disposed around a portion of the handle member 12 at a position above the blade element 20. In this embodiment, the splash guard 52 includes a splash guard orifice 56 that is sized and shaped so as to allow the splash guard 52 to be inserted over the first end 14 of the handle member 12 and positioned in operational interrelationship with the rim 54. For example, as illustrated in FIG. 6, the splash guard 52 is a dome 58 that can be slid over the handle member 12 and engaged with, such as frictionally engaged with or otherwise attached to, the rim 54. In addition, in the embodiment of FIG. 6, the indent 28 is the pressure enhancing structure 18.

The embodiment of FIG. 7 illustrates a partial dome 58, however in this embodiment, a sidewall 60 extends from the dome 58. This sidewall 60 provides additional splash protection during food preparation. In addition, the splash guard 52 is engaged with the rim 54 using an attachment structure 62. In this embodiment, the attachment structure 62 is a hook-and-loop fastening arrangement 64. For example, as seen in FIG. 7, a hook pad 66 is attached to an inner surface 70 of the dome 58. This hook pad 66 is constructed with hooks so as to engage a loop pad 68 that is attached to surface 72 of the rim 54. This hook-and-loop fastening arrangement 64 can be in the form of Velcro®, as is known in the art. In particular, the hook pad 66 is either on the inner surface 70 of the dome 58 or the surface 72 of the rim 54, and the loop pad 68 is on the other surface 72, 70. Any appropriate attachment structure 62 is envisioned.

Further, the splash guard 52 may be formed with or integral with the handle member 12. In addition, the splash guard 52 may be manufactured from a transparent material, or a partially transparent material, such that the user may be able to view the blade element 20 and the food item 100 during the contact process.

The blade element 20 may be in any desired form and have any desired surface. For example, the edge of the blade element 20 may be sharpened, blunt, rounded, serrated or any combination thereof. In addition, when the blade element 20 is removable from the handle member 12, the user may select various edges and surfaces for use in connection with the contacting, chopping, separating or manipulation of various food items 100.

The handle member 12, the blade element 20 or any combination thereof may be formed from or coated with a material that will not scratch a surface of a cooking implement, such as a skillet 102. In addition, the handle member 12, the blade element 20 or any combination thereof may be formed from or coated with a material that is heat resistant, such that it can be used in connection with a heated skillet 102 or other hot surface.

In one embodiment, the handle member 12 and the blade element 20 are made from a synthetic material that is heat resistant and will not scratch the surface of a cooking implement. In addition, the entire food contact device 10 may be made from a contiguous form and material, for ease of manufacturing. For example, the food contact device 10 may be formed or manufactured as a single, continuous and integral piece. In addition, the handle member 12, the blade element 20 or other components of the food contact device 10 may be made from a plastic, a polymer, a thermoplastic, a metal, a semi-metal, a coated material or any combination thereof.

Figure 8:
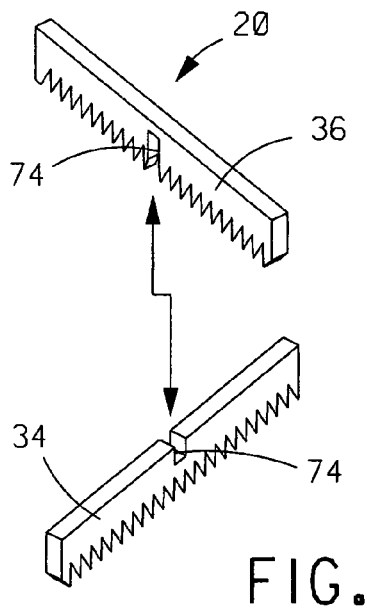
FIG. 8 is an exploded view of one embodiment of blade elements of a food contact device according to the principles of the present invention.

In one embodiment, and as illustrated in FIG. 8, the first blade element 34 and the second blade element 36 may be removable or detachable from each other. For example, the first blade element 34 and the second blade element 36 may include co-acting slots that can be mated together and provide the above-described cross configuration. Any manner of engaging the blade elements 34, 36 together is envisioned. In addition, in this embodiment, each of the blade elements 34, 36 include a serrated edge to enhance the chopping and separating function.

Figure 9:
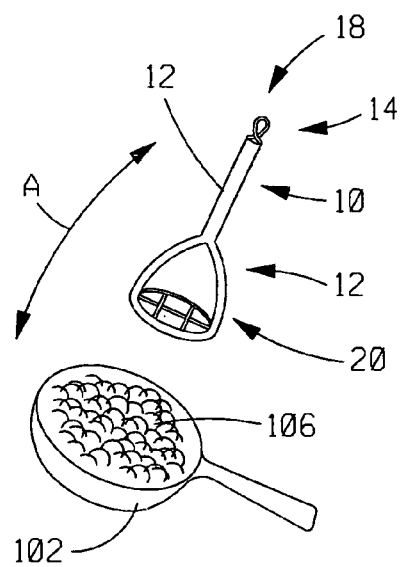
FIG. 9 is a perspective view of one embodiment of a food contact device according to principles of the present invention in use in connection with a food item in a skillet.

FIG. 9 illustrates an embodiment of the food contact device 10 in connection with a food item 100 and skillet 102. In this embodiment, multiple blade elements 20 are in contact with the second end 16 of the handle member 12, and these blade elements 20 are in the form of a grid pattern. Of course, any configuration, size and geometry are envisioned for the pattern or number of blade elements 20 used in connection with the food contact device 10. Also, as discussed above, the blade elements 20 may be removable from the handle member 12, and replaceable with a desired blade element 20 configuration. Also, as illustrated in FIG. 9, the user moves the food contact device 10 in a contact direction A to contact, manipulate, chop or otherwise separate the food item 100 in the cooking implement, in this case a skillet 102. The pressure enhancing structure 18 allows the user to effect the appropriate force in the contact direction A.

While the pressure enhancing structure 18 discussed above has been generally directed to a structure to receive, engage or otherwise contact a person's thumb, any suitable pressure enhancing structure 18 is envisioned. For example, the pressure enhancing structure 18 may be a surface that contacts or otherwise engages the user's fingers, palm or other suitable parts and portions of the user's hands. Simply, the pressure enhancing structure 18 provides a surface or element that assists the user in facilitating a stronger, more direct and more efficient contact action in the contact direction A.

In this manner, the food contact device 10 of the present invention provides a pressure enhancing structure 18 that, when used in connection with the handle member 12, provides an improved slicing, chopping, separating or similar contact device. In addition, by providing various pressure enhancing structures 18 and/or various blade elements 20 that are attachable to and releasable from the handle member 12, the food contact device 10 is easily configurable into a variety of desired arrangements. This allows various users having different physical traits to effectively use the food contact device 10 of the present invention. Still further, when manufactured from an appropriate material, the food contact device 10 can be both heat resistant and will not scratch a surface of a cooking implement, such as a skillet 102.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A food contact device comprising:
   a) a handle comprising:
      i) a body portion comprising a single member with a first end and a second end, the first end including a pressure enhancing structure with a single indent extending at least partially within the first end of the single member of the body portion of the handle for placement of a user's thumb therein;
      ii) a rim extending from a portion of the single member of the body portion of the handle between the first and second ends of the single member; and
      iii) a gripping portion positioned on the single member of the body portion between the rim and the first end having a gripping surface comprising finger indentation portions, ridges, a non-slip surface or any combination thereof formed on or integral with the gripping portion;
   b) a blade holding member positioned substantially perpendicularly to the second end of the single member of the body portion of the handle member and supported by a plurality of arms extending from the second end of the single member and configured to engage a plurality of blade elements, the blade holding member comprising a ring member with a plurality of aligned slots positioned on a surface thereof, the plurality of blade elements, which extend at least partially across an inner area of the ring member, are sized and shaped so as to mate with the aligned slots, and are engageable with and releasable from the blade holding member, such that the plurality of blade elements are removable therefrom; and
   c) a releasable splash guard in contact with the rim of the handle member and positioned above the plurality of blade elements, the splash guard configured to protect a user from material moving up towards the first end of the single member of the body portion of the handle;
   wherein a user grasps the handle, effects force in a contact direction via the handle and the pressure enhancing structure, such that the plurality of blade elements contact a food item.

2. The food contact device of claim 1, wherein the plurality of blade elements is at least one of sharpened, blunt, rounded and serrated.

3. The food contact device of claim 1, wherein at least one of the handle and the plurality of blade elements is formed from or coated with a material that will not scratch a surface of a cooking implement.

4. The food contact device of claim 1, wherein at least one of the handle members and the plurality of blade elements is formed from or coated with a material that is heat resistant.

5. The food contact device of claim 1, wherein at least one of the handle and the plurality of blade elements is formed from a synthetic material, a plastic, a polymer, a thermoplastic, a metal, a semi-metal, a coated material or any combination thereof.

* * * * *